May 29, 1945.  B. BOLLI  2,377,068
TWO STROKE CYCLE ENGINE
Filed July 19, 1943
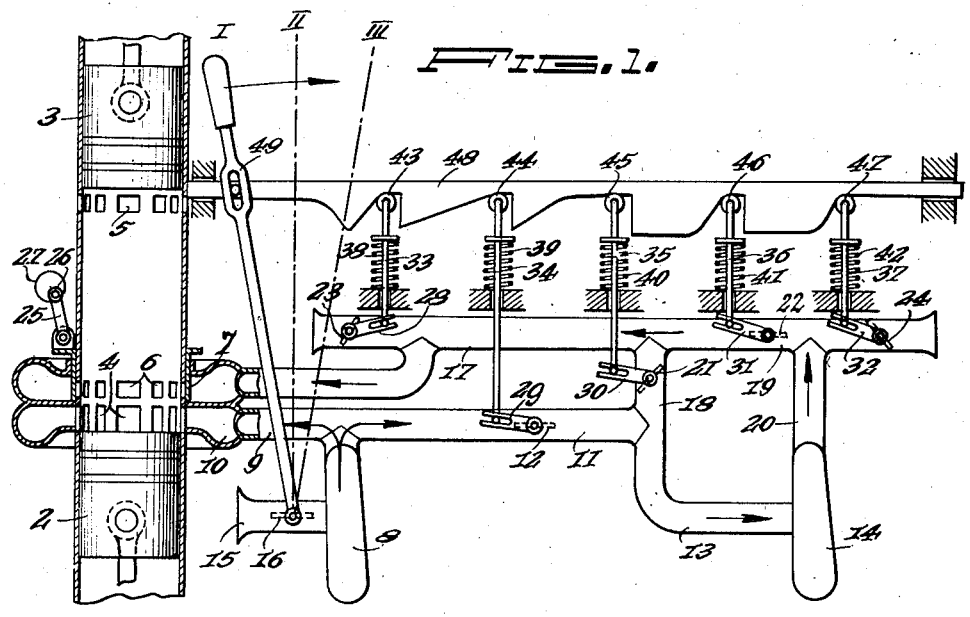
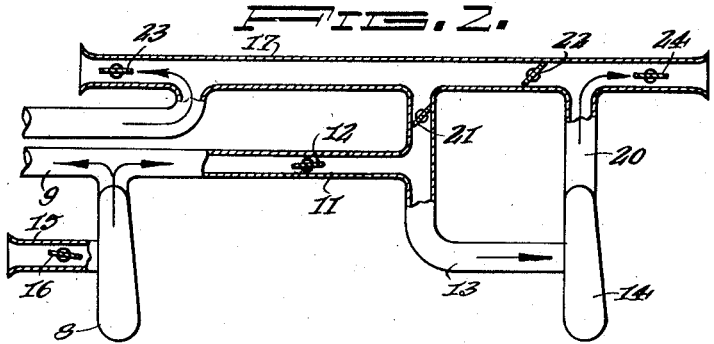
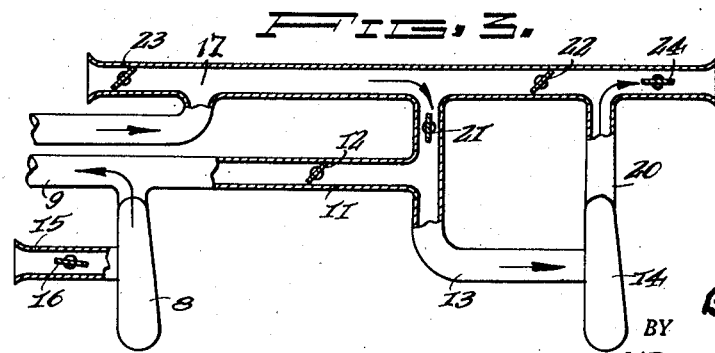
INVENTOR.
Bernhard Bolli
BY
Michaelis & Michaelis
ATTORNEYS Patented May 29, 1945

2,377,068

UNITED STATES PATENT OFFICE 2,377,068

TWO-STROKE CYCLE ENGINE

Bernhard Bolli, Arbon, Switzerland, assignor to Aktiengesellschaft Adolph Saurer, Arbon, Switzerland Application July 19, 1943, Serial No. 495,308
In Germany March 10, 1942

8 Claims. (Cl. 123—51)

This invention relates to supplementary charging air control devices for two-stroke cycle internal combustion engines having controlled supplementary charging air ducts to which air under pressure is supplied from a supplementary air compressor when the engine operates under full load in light oil two-stroke cycle engines the relation between air and fuel should vary only within narrow limits in order to ensure perfect ignition and combustion and high efficiency. However in contrast to four stroke cycle engines it is difficult to provide the slight amount of cylinder air admission required for two-stroke cycle engines when running under light loads.

In order to overcome this difficulty it has been proposed to throttle the supply of supplementary charging air as well as that of scavenging air. By throttling the supply of supplementary charging air the charge can be varied only in a relatively small degree. On the other hand the throttling of the scavenging air, while resulting in a reduction of cylinder air admission to any desired small extent, involves an increase in the amount of combustion gases remaining in the cylinder from the preceding working stroke. In order to ensure perfect ignition and efficient combustion while maintaining the best fuel-air mixture it is imperative that only a small amount of exhaust gas be left in the cylinder. Therefore mere throttling of the scavenging air cannot afford a satisfactory control.

According to the present invention, the slight amount of pure air required in engines of the type aforesaid when running under light load, is obtained by interrupting the communication between the supplementary charging air ducts and the pressure pipe connection of the supplementary compressor and establishing communication between these ducts and the suction pipe of the compressor. In this way at the end of the scavenging period air is withdrawn from the cylinder by suction in engines in which the supplementary charging air conduit is opened and closed by means of a separate control member the time of opening of the supplementary charging air port area can thus be lengthened or shortened and thereby an amount of air as small as desired can be obtained within the cylinder.

In order that any desired amount of air can be admitted into the cylinder the supplementary charging air ducts are connected according to this invention, with the suction as well as with the pressure pipe connection of the supplementary compressor by way of conduits that can be shut off. The branch leading to the pressure pipe connection will be completely open and the branch leading to the suction completely shut when the engine is fully loaded. With the load on the engine decreasing the branch leading to the pressure pipe connection will gradually be throttled until it is completely shut off, whereupon the branch leading to the suction pipe is fully opened.

In order to obtain an entirely smooth change-over from supplementary air admission to air withdrawal by suction, provision is made, according to the invention, for connecting the supplementary charging air conduit with the atmosphere by a controllable port. As the engine loading decreases this port is opened, commensurate with the gradual closing of the connection between the pressure pipe of the compressor and the supplementary air conduct and it is shut off again when communication is established between the suction side of the compressor and the supplementary air conduit.

An embodiment of the invention is illustrated in the accompanying drawing, by way of example only, in which Fig. 1 is a diagrammatic section of the combustion cylinder of a two-stroke cycle engine provided with the supplementary charging air control device according to the invention with the parts of the device in position corresponding to full load apparatus of the engine;

Fig. 2 is a view similar to Fig. 1 but with the parts of the device in position of average load operation;

Fig. 3 illustrates the conditions of control corresponding to minimum engine loading.

Referring to the drawing, in the cylinder 1 two working pistons 2 and 3 move in opposite directions. The scavenging slots 4 are controlled by the piston 2 and the exhaust slots 5 by the piston 3. Above the scavenging slots 4 supplementary charging air slots 6 are arranged in the cylinder wall which are uncovered at the end of the scavenging period by a sleeve valve 7, and are subsequently covered again by the working piston 2. To this end, axial reciprocating movement is imparted to the sleeve valve 7 by a connecting rod 25 which is connected with the pin 26 of a crank disc 27 which in turn is driven by the engine in synchronism with the engine speed.

The pressure side of a scavenging blower 8 is connected with a scavenging air collecting space 10 through a conduit 9 and with the suction 13 of a supplementary charging air compressor 14 through a conduit 11 provided with a shut off valve 12. The scavenging and supercharging blowers are driven by the engine in a known manner. In the suction 15 of the scavenging blower 8 also a control valve 16 is arranged.

An air conduit 17 leading to the supplementary charging air slots 6 communicates with the suction pipe 13 and with the pressure pipe 20 of the supplementary blower 14 by way of pipe sections 18 and 19 respectively. These branch pipes can be shut off by means of valves 21 and 22 respectively. In the conduit 17 and in the pressure pipe 20 of the supplementary blower regulating valves 23 and 24 respectively are arranged.

The stems of the valves 12, 21, 22, 23 and 24 are acted upon by push rods 33, 34, 35, 36 and 37, respectively, through lever arms 28, 29, 30, 31 and 32 respectively, the ends of said rods carrying rollers 43, 44, 45, 46 and 47, respectively. Springs 38, 39, 40, 41 and 42, respectively, press the rollers against cam faces of a lengthwise displaceable rail 48 which is coupled with the admission lever 49 of the engine. The stem of the valve 16 also is connected to the lever 49 so that in shifting this lever from full load position (I) through half load position (II) into no-load position (III) all the valves are controlled.

This control device operates as follows:

With the engine running under full load the scavenging blower 8 forces air, drawn in past the opened valve 16 into the scavenging air space 10 and also through the conduit 11 into the suction pipe 13 of the supplementary blower 14. The latter conveys the air under increased pressure through the open valve 22 in the conduit 19 into the conduit 17. The valve 21 in the connecting branch 18 and the valves 23, 24 for communication with the atmosphere are then shut, so that on the uncovering of the supplementary air slots 6 charging of the cylinder 1 is charged with supplementary air (Fig. 1).

As the engine output drops the valve 22 is gradually closed in order to reduce the air admission to the cylinder, while the valves 23, 24 are gradually opened. Consequently, the pressure in the charging conduit 17 drops continuously until it is equal to atmospheric pressure, when the valve 22 is closed and the valves 23 and 24 are completely open. The connecting branch 11 is thus so throttled by means of the valve 12 in such manner that the pressure in the suction pipe 13 of the supplementary blower 14 is now lower than atmospheric pressure. Therefore the supplementary blower delivers air into the atmosphere through the open valve 24 (Fig. 2), thereby creating a slight underpressure in the suction pipe 13.

In order to further reduce the amount of cylinder air admission the valve 21 is now gradually opened, while the valves 12, 23 and the pipes controlled by them are shut off, as shown in Fig. 3. The smallest amount of cylinder air-admission is obtained when the valve 21 is completely open, because then the supplementary blower 14 withdraws air by suction from the charging conduit 17 and also through the slots 6 from the cylinder 1 and discharges it into the atmosphere.

During the closing movement of the valve 12 the cross sectional area offered by the throttling valve 16 to the scavenging blower 8 for drawing in air therethrough by suction action is also somewhat reduced, so that the scavenging pressure in the space 10 remains constant or drops only slightly. The scavenging of the combustion cylinder 1 is thus effected with a constant or a hardly noticeably smaller surplus amount of air over the whole range of control so that at the end of the scavenging period always substantially pure air is present in the combustion cylinder.

I wish it to be understood that I do not wish to be limited to the exact details of construction described in the foregoing specification and shown in the drawing, for obvious modification will occur to a person skilled in the art.

I claim:

1. A two-stroke cycle internal combustion engine comprising in combination, a working cylinder, supplementary charging air ducts leading into said cylinder, a supplementary charging air compressor having a pressure end and a suction end, a controllable conduction system arranged between said two ends of said compressor and said ducts, two connecting branches included in said conduction system and joining with a supplementary charging air conduit in said system, a connection leading from said conduit to the atmosphere, said branches connecting said ducts with said pressure end and said suction end of said compressor respectively through said conduit, control means included in both said connecting branches and in said connection for fully opening said branch leading to said pressure end and shutting said branch leading to said suction end when the engine operates under full load, and for continually throttling said pressure end branch more and more up to full closure and simultaneously opening said connection, for said compressor to discharge into the atmosphere at increasing rate, as well as correspondingly opening said suction end branch up to the maximum as the load on the engine decreases to a minimum.

2. A two-stroke cycle internal combustion engine comprising in combination, a working cylinder, supplementary charging air ducts leading into said cylinder, a supplementary charging air compressor having a pressure end and a suction end, a controllable conduction system arranged between said two ends of said compressor and said ducts, two connecting branches included in said conduction system and joining with a supplementary charging air conduit in said system, said branches connecting said ducts with said pressure end and said suction end on said compressor respectively through said conduit, control means included in both said connecting branches for fully opening said branch leading to said pressure end and shutting said branch leading to said suction end when the engine operates under full load, and control means in said conduit for connecting the latter with the atmosphere for changing over from charging said cylinder with supplementary air to withdrawing air from said cylinder by suction action by continually throttling said pressure end branch more and more up to full closure as well as correspondingly opening said suction end branch up to the maximum as the load on the engine decreases to a minimum, said conduit being connected with the atmosphere between the limits of the range of said changing over.

3. A two-stroke cycle internal combustion engine comprising in combination, a working cylinder, supplementary charging air ducts leading into said cylinder, a supplementary charging air compressor having a pressure end and a suction end, a controllable conduction system arranged between said two ends of said compressor and said ducts, two connecting branches included in said conduction system and joining with a supplementary charging air conduit in said system, said branches connecting said ducts with said pressure end and said suction end on said compressor respectively through said conduit, control means included in both said connecting branches for fully opening said branch leading to said pressure end and shutting said branch leading to said suction end when the engine operates under full load, means included in said conduit for regulating communication of said conduit with the atmosphere, and control means in said conduit for connecting the latter with the atmosphere for changing over from charging said cylinder with supplementary air to withdrawing air from said cylinder by suction action by continually throttling said pressure end branch more and more up to full closure, while said regulating means is opened, as well as correspondingly opening said suction end branch up to the maximum as the load on the engine decreases to a minimum, said conduit being connected with the atmosphere between the limits of the range of said changing over while said regulating means is being closed again.

4. A two-stroke cycle internal combustion engine comprising in combination, a scavenging air compressor, a working cylinder, supplementary charging air ducts leading into said cylinder, a supplementary charging air compressor having a pressure end and a suction end, an air supply passage leading from said scavenging air compressor to said charging air compressor, a controllable conduction system arranged between said two compressor ends and said ducts, two branches included in said conduction system for connecting said ducts with said pressure end and said suction end, respectively, a connecting conduit between said scavenging air blower and said branch leading to said suction end, control means included in both said connecting branches, for fully opening said branch leading to said pressure end and shutting said branch leading to said suction end when the engine operates under full load, and a throttling member included in said connecting conduit for so throttling said conduit when said pressure end branch is continually throttled more and more up to full closure and said suction end branch is correspondingly opened up to its maximum as the load on the engine decreases to a minimum that at the moment of opening of said suction end branch the pressure in the suction end is below atmospheric pressure and with said opening continuing said air supply passage is completely closed.

5. A two-stroke cycle internal combustion engine comprising in combination, a scavenging air compressor having a suction, a shut off member included in said suction, a working cylinder, supplementary charging air ducts leading into said cylinder, a supplementary charging air compressor having a pressure end and a suction end, an air supply passage leading from said scavenging air compressor to said charging air compressor, a controllable conduction system arranged between said two compressor ends and said ducts two branches included in said conduction system for connecting said ducts with said pressure end and said suction end, respectively, a connecting conduit between said scavenging air blower and said branch leading to said suction end, control means included in both said connecting branches, for fully opening said branch leading to said pressure end and shutting said branch leading to said suction end when the engine operates under full load, and a throttling member included in said connecting conduit for so throttling said conduit, as the load on the engine decreases to a minimum that at the moment of opening of said suction end branch the pressure in the suction end is below atmospheric pressure and with said opening continuing said air supply passage is completely closed, said shut off member reducing the port area of said suction commensurate with said air supply decreasing for maintaining the scavenging air pressure substantially constant.

6. A two-stroke cycle internal combustion engine comprising in combination, a working cylinder, supplementary charging air ducts leading into said cylinder, a supplementary charging air compressor having a pressure end and a suction end, a controllable conduction system arranged between said two ends of said compressor and said ducts, control means included in said conduction system for disconnecting said ducts from said pressure end on said compressor, further control means included in said system for connecting said ducts with said suction end on said compressor, and means for prolonging the opening time of said ducts as these communicate with said suction end, both said control means being conjointly operable for withdrawing air from said cylinder by suction action when the engine operates under light loads.

7. A two-stroke cycle internal combustion engine comprising in combination, a working cylinder, supplementary charging air ducts leading into said cylinder, a supplementary charging air compressor having a pressure end and a suction end, a controllable conduction system arranged between said two ends of said compressor and said ducts, control means included in said conduction system for disconnecting said ducts from said pressure end on said compressor, further control means included in said system for connecting said ducts with said suction end on said compressor, and means for postponing the opening time of said ducts as these communicate with said suction end, both said control means being conjointly operable for withdrawing air from said cylinder by suction action when the engine operates under light loads.

8. A two-stroke cycle internal combustion engine comprising in combination, an engine cylinder formed with scavenging ports, exhaust ports and supplemental air intake ports, a piston arranged for reciprocation in said cylinder, and sweeping said ports, a main air compressor and a supplementary air compressor, a pressure pipe leading from said main compressor to said scavenging port, another pressure pipe leading from said supplementary compressor to said supplementary air intake ports, an intermediate conduit connecting the pressure side of said main compressor to the suction side of said supplementary compressor, a branch pipe connecting said intermediate conduit with the pressure pipe of said supplementary compressor, means for throttling the passage of air into the suction sides of both compressors, through said branch pipe and through the pressure pipe of said supplementary compressor, individual means for adjusting each throttling means and means for controlling all said adjusting means.

BERNHARD BOLLI.